United States Patent [19]

Zimmerman

[11] Patent Number: 4,654,716
[45] Date of Patent: Mar. 31, 1987

[54] LASER DISPLAY OF AN ELECTRONICALLY GENERATED IMAGE SIGNAL

[76] Inventor: S. Mort Zimmerman, 13626 Neutron Rd., Dallas, Tex. 75234

[21] Appl. No.: 562,160

[22] Filed: Dec. 16, 1983

[51] Int. Cl.⁴ .............................................. H04N 5/74
[52] U.S. Cl. ...................................... 358/237; 358/63; 358/231
[58] Field of Search ............... 358/237, 231, 230, 232, 358/233, 236, 60, 61, 62, 63, 64

[56] References Cited

U.S. PATENT DOCUMENTS

| | | | |
|---|---|---|---|
| 3,699,438 | 10/1972 | Pinnow | 358/231 |
| 3,727,001 | 4/1973 | Gottlieb | 358/235 |
| 4,150,396 | 4/1979 | Hareng | 358/63 |

OTHER PUBLICATIONS

Maser and Laser Engineering, by Dr. Ishii, Robert E. Krieger Publishing Company, New York, 1980, pp. 231–287.

Primary Examiner—Tommy P. Chin
Attorney, Agent, or Firm—Peter J. Murphy

[57] ABSTRACT

A laser device includes, within an envelope, an electron gun, and a structure providing a light resonating cavity which includes confronting reflecting surfaces and a semiconductor material which is pumped by the electron beam producing emission of light within the cavity. The resonator cavity consists of mirror bodies having confronting reflective surfaces in parallel planes, one surface being fully reflective and one surface being partially reflective, and a semiconductor wafer mounted adjacent to one of the mirror bodies to be impinged by the electron beam. The electron beam is swept across the semiconductor wafer in a selected pattern, such as the conventional television pattern, and a laser beam is emitted from the lasering device which follows the pattern traced by the electron beam. The apparatus may be controlled by a television produced signal. The produced laser beam is modulated by means of a crystal lens modulator controlled by a television signal; and the beam is projected onto a viewing target or screen through a suitable lens system.

14 Claims, 2 Drawing Figures

LASER DISPLAY OF AN ELECTRONICALLY GENERATED IMAGE SIGNAL

This invention relates to visual display, by means of a laser device, of an image generated from an image signal produced for display on a cathode ray tube; and more particularly to display by laser projection of a television generated image.

This invention is concerned, in one aspect thereof, with apparatus for producing an enlarged projection of a television picture, for example, without utilizing a television picture tube or other cathode ray display tube. Apparatus for that purpose is disclosed in Lax U.S. Pat. No. 3,655,986. In the projection of images such as a television picture, image resolution is important. It appears that the vertical resolution of a television picture produced by the Lax apparatus would be inherently poor because of an extreme limitation placed on the number of horizontal lines that may be produced with this apparatus.

An object of this invention is to produce a laser beam which scans a projection surface in the manner of a CRT electron beam.

Another object of this invention is to produce a laser beam which scans a projection surface under the direction of a scanning electron beam.

A further object of this invention is to provide a laser beam which scans a projection surface under the direction of a scanning electron beam, and which laser beam is modulated to produce a coherent visual image on that projection surface.

Still another object of this invention is to provide a scanning laser beam projected through a focusing system to produce an enlarged projected image on a viewing surface.

A still further object of this invention is to provide a laser beam which scans a projection surface under the direction of a television generated scanning electron beam, and which laser beam is modulated in accordance with the television signal to produce a projected television image.

Another object of this invention is to provide a scanning laser beam produced from bombardment of a semiconductor body by a scanning electron beam.

A further object of this invention is to provide a scanning laser beam to produce a coherent visual image with good vertical and horizontal resolution.

Another object of this invention is to produce a television picture without the use of a conventional television picture tube.

These objects are accomplished in a method for producing a laser display of an image generated from an image signal, including the following steps.

A laser device is formed to have a resonator cavity, and a semiconductor body disposed with said resonator cavity having a scanning surface disposed transverse to the resonator cavity. The semiconductor body is pumped by means of an electron beam to produce a laser beam emanating from the laser cavity. The electron beam is controlled to scan the scanning surface of the semiconductor body in a predetermined pattern, thereby producing a scanning laser beam which follows the pattern of the scanning electron beam. The intensity of the scanning laser beam is modulated in accordance with the generated image signal.

These objects are also accomplished by apparatus for producing a laser beam projection image which includes the following components. A laser device includes an optical resonator cavity which is formed between confronting fully reflective and partially reflective surfaces, and further includes a semiconductor body disposed within that resonator cavity and having a scanning surface transverse to the axis of that resonator cavity. An electron gun is disposed to direct an electron beam toward that scanning surface of the semiconductor body, to pump the body to produce a laser beam in cooperation with the resonator cavity. Control means is provided for controlling the sweeping of the electron beam across the scanning surface, to produce a corresponding laser beam moving laterally relative to the resonator cavity. A light modulating means is disposed outside the resonator cavity to modulate the laser beam emanating therefrom. Means responsive to a generating image signal is provided for controlling the electron beam control means and the light modulating means.

The novel features and the advantages of the invention, as well as additional objects thereof, will be understood more fully from the following description when read in connection with the accompanying drawings.

DRAWINGS

FIG. 1 is a diagrammatic and schematic representation of apparatus according to the invention; and FIG. 2 is a diagrammatic and schematic representation of a modified form of apparatus according to the invention.

DESCRIPTION OF THE PREFERRED EMBODIMENTS

Figure 1:
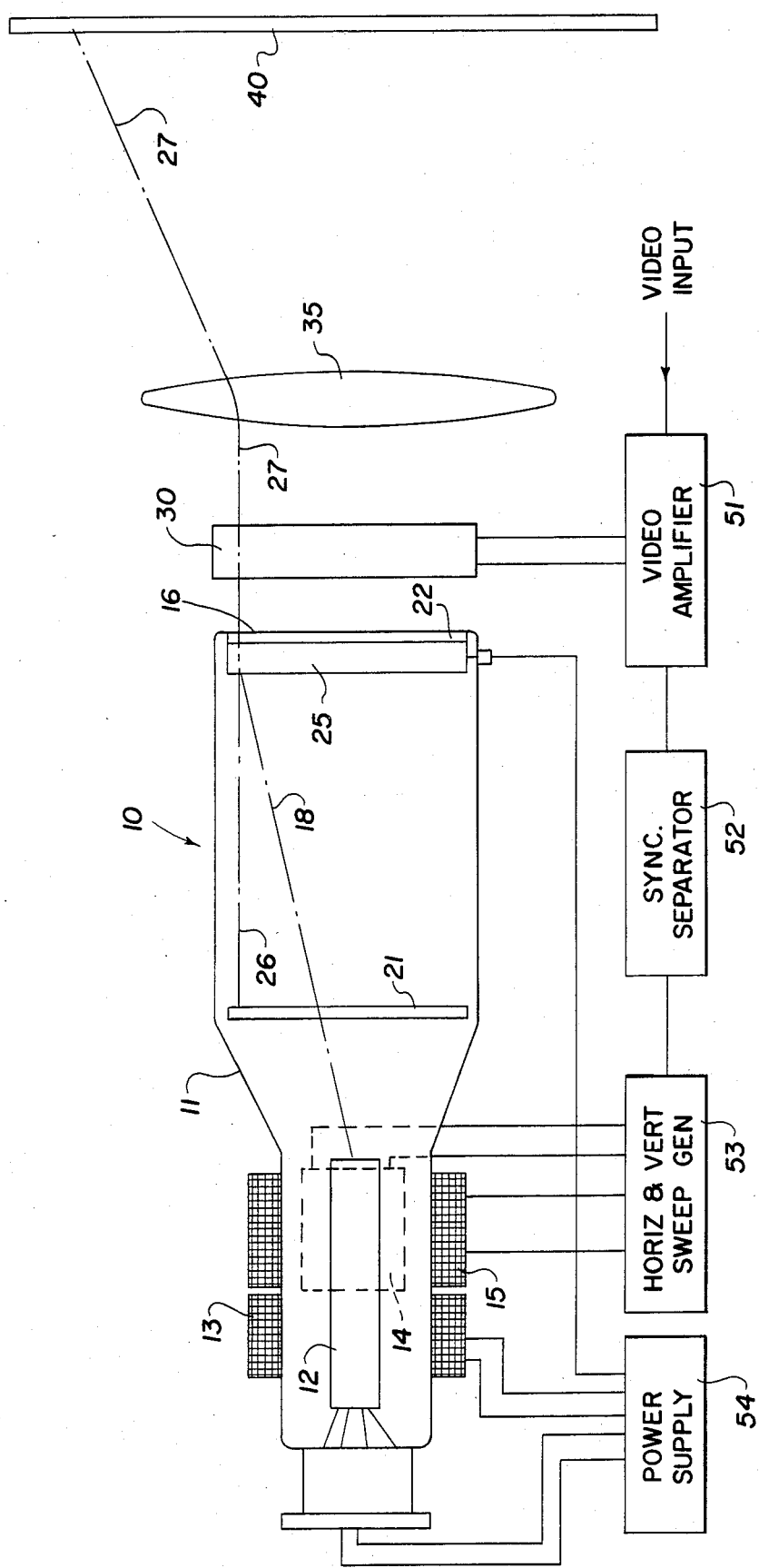

The preferred form of apparatus, illustrated in FIG. 1, is designed for producing and projecting a television image from a video signal produced by a television camera and transmitted by any suitable means to the apparatus of the invention. It will be understood, however, that the apparatus of the invention is capable of producing an image of any signal generated to produce deflection of an electron beam in a cathode ray tube.

Referring to FIG. 1, the basic components of the apparatus of the invention include a laser device 10, a modulating device 30 for modulating the produced laser beam, a focusing and enlarging lens system 35 for projecting the laser beam on an imaging surface, an imaging screen or surface 40, and associated circuitry. The laser device 10, as illustrated in FIG. 1, consists of an elongated sealed envelope 11 having a reduced diameter neck at one end. An electron gun 12, of the type found in television picture tubes, or in other cathode ray tubes, is enclosed within the neck of the envelope 11 for projecting an electron beam toward a target adjacent to the other end of the envelope as will be described. Components associated with the electron gun include a focusing coil 13 and horizontal and vertical deflection coils 14 and 15 respectively.

Disposed within the enlarged end of the envelope 11 are a fully reflective mirror 21, nearer to the electron gun 12, and a partially reflective mirror 22 adjacent to the end face 16 of the envelope 11. As illustrated in the drawing, the end face 16 may be planar and perpendicular to the longitudinal axis of the envelope 11; and the mirror 22 may be mounted directly on the end face 16.

These mirrors have confronting reflective faces which produce a resonator cavity within the laser device for producing the lasering action or oscillation of the generated light waves.

A wafer of CdS or other suitable semiconductor material 25 is mounted contiguous to the partially reflective mirror 22 adjacent to the end face 16. This CdS wafer is the target for the electron beam 18 produced by the electron gun 12; and accordingly this wafer or its associated support structure must function as an anode for the electron beam generating system. The mirror 21 must be electron passive so as to present little or no interference with the electrons directed toward the wafer 25.

It is known that in certain semiconductor materials, a lasering action or a strong emission of light radiation is produced when those materials are pumped or impinged by a beam of high energy electrons. Such lasering action has been demonstrated, or at least experimentally verified, in the following materials: ZnO, GaAs, ZnS, CdS, GaSe, $CdS_xSe_{1-x}$, CdSe, CaTe, GaSb, InAs, InSb, Te, PbS, PbTe, PbSe and CaSe. When such semiconductor bodies are disposed in a resonator cavity, certain of the admitted radiation oscillates between the reflective surfaces of that cavity thereby amplifying the emission and the intensity of the radiation such that a focused laser beam emerges from the resonator cavity through the partially reflective mirror. In the apparatus of FIG. 1 then, light radiation 26 oscillates within the cavity of the laser device and produces a laser beam 27 emerging from the end face 16 of that device.

Referring now to the circuitry illustrated in FIG. 1, which is conventional circuitry associated with a television receiver. The video input signal is received and amplified in a video amplifier 51, and a portion of that signal is passed to a sync separator 52 which detects the synchronization signals for controlling the deflection of the horizontal and vertical deflection coils 14 and 15 by means of the horizontal and vertical sweep generator 53. A suitable power supply 54 provides power to the control circuits of the apparatus.

The electron beam then, is controlled in the usual manner to scan the semiconductor wafer 25 in the usual scanning pattern for a television image or frame. As the electron beam scans or pumps the semiconductor wafer 25 it produces a succession of laser beams 27 which emerge from the end face parallel with each other and in a scanning pattern which follows the pattern of the impinging electron beam 18. The effect of this succession of momentary laser beams is that of a continuous laser beam which emerges from the laser device 10 to scan a selected target with the same pattern and timing as the scanning of the target semiconductor wafer 25 by the electron beam 18.

This produced moving laser beam emerging from the laser device 10 is, however, of uniform intensity. In order to produce a coherent image on a target of the laser beam, the laser beam must be modulated by the video input signal. This modulation is accomplished by means of a suitable light modulating device such as a crystal lens modulator 30 disposed to intercept the moving laser beam 27 which emerges from the device 10. This modulator 30 is coupled to the video amplifier 51 in synchronization with the television frame pattern generated by the electron beam so that a coherent television picture is produced at the target of the moving laser beam. Suitable crystal lens modulators for this purpose are well known in the art, and are discussed in U.S. Pat. Nos. 3,402,002, 3,621,133, 3,691,484, and 4,033,080. Such modulators are also discussed in the publication "Maser and Laser Engineering", Robert E. Krieger Publishing Company 1980, pages 273 and following.

As seen in FIG. 1, the target 40 for the laser beam may be an imaging screen or surface of any selected size; and the apparatus of the invention includes a focusing and enlarging lens system 35 to project the image of the moving laser beam 27 on the imaging surface.

Figure 2:
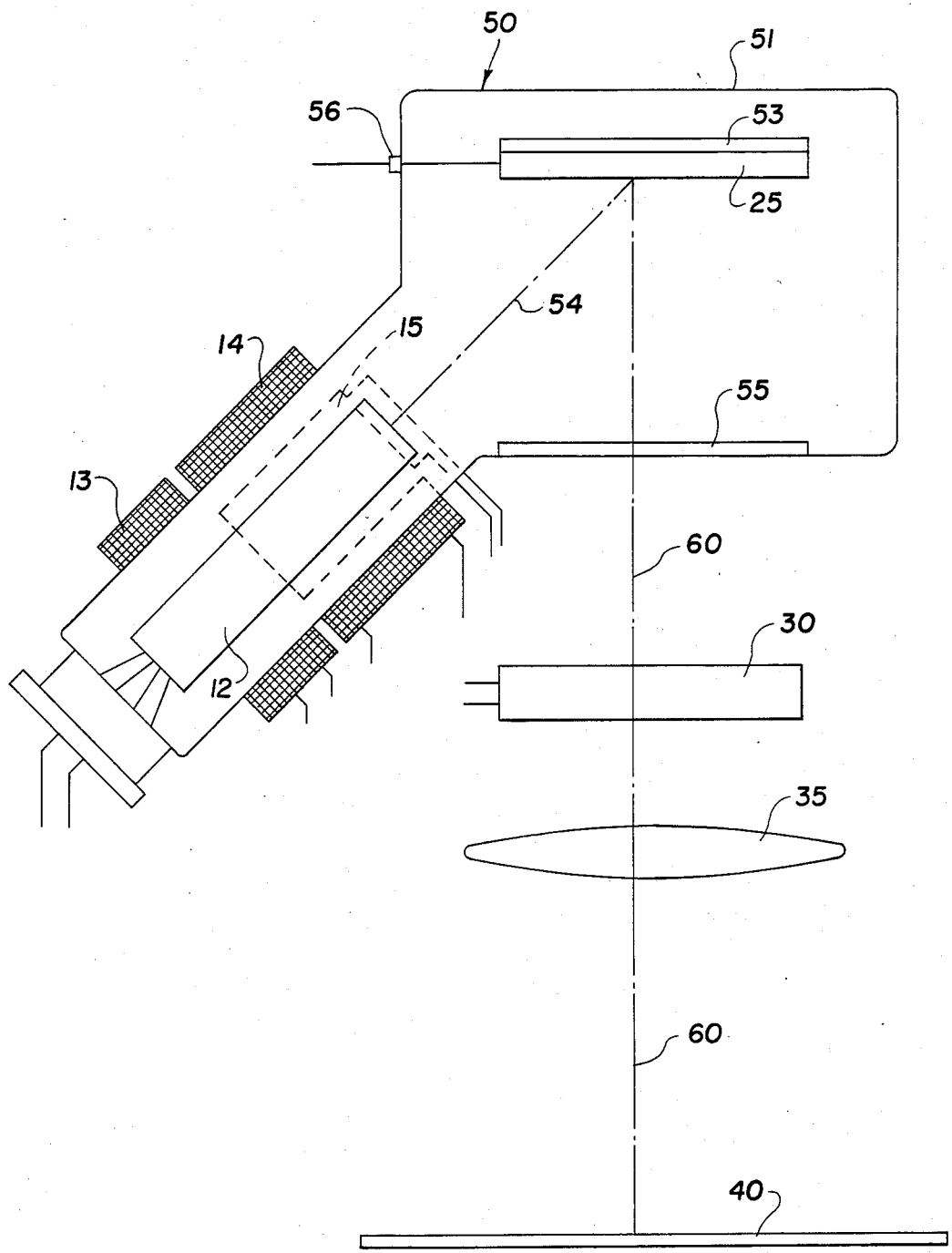

FIG. 2 illustrates a slightly modified form of apparatus according to the invention, including a laser device 50 having a different physical configuration to enable the design of a more compact apparatus or system using the laser device. The basic components of the system of FIG. 2 include the laser device 20, and the previously described modulating device 30, enlarging lens system 35, and imaging screen or surface 40.

The laser device 50 consists of a sealed envelope 51 having a reduced diameter neck at one end and an enlarged bulbous head at the other end defining a chamber 52 for enclosing the mirrors and other components which make up the laser resonator cavity.

The neck of the envelope 51 again encloses an electron gun 12, as previously described, for projecting a high power electron beam into the envelope chamber 52. Components associated with the electron gun include a focusing coil 13 and horizontal and vertical deflection coils 14 and 15 respectively.

The laser device 50 is configured such that the laser beam 60 will emerge at an acute angle relative to the axis of the electron gun 12. The laser resonator cavity is formed by a fully reflective mirror 53 disposed within the chamber 52 to intercept the electron beam 54 generated by the electron gun. The reflective plane of this mirror 53, however, is disposed at an angle relative to the axis of the electron gun. A partially reflecting mirror 55 is disposed in parallel confronting relation with the mirror 53 to define a resonant optical cavity, and this mirror 55 is positioned so that it does not interfere with the electron beam 54. It will be seen then that the laser beam 60 emerges from the device 50 at an acute angle relative to the axis of the electron gun.

A wafer 25 of CdS or other suitable semiconductor material is mounted contiguous to the fully reflective mirror 53. This CdS wafer is the target for the electron beam 54, and this wafer or its associated support functions as an anode for the electron beam generating system. An anode terminal 56 is shown on the exterior of the envelope 51.

The electron beam 54 is controlled in the usual manner to produce the usual scanning pattern for a television image or frame which is essentially rectangular. Since the target wafer 25 is inclined relative to the axis of the electron gun, the scanning pattern on the target surface of the wafer will not be rectangular, but rather will be somewhat trapezoidal; and the resultant pattern traced by the emerging laser beam 60 will also be somewhat trapezoidal. If this distortion is too great, some compensation may be made in the deflection system for the electron beam including the deflection coils 14 and 15 to produce a trapezoidal electron beam pattern which will result in a rectangular scanning pattern on the surface of the wafer 25, and a resultant rectangular image ultimately projected onto the image target or screen 40.

The emerging laser beam 60 is modulated in the manner previously described by a crystal lens modulator 30, and the laser beam image is focused and enlarged by a lens system 35 as previously described. The circuitry for controlling the system of FIG. 2 may be the same as that described with reference to the system of FIG. 1, with the exception of modification for the electron beam deflection system as mentioned above.

METHOD

Methods, according to the invention, for producing a laser beam visual image from an electronically generated and transmitted signal include the following steps:

(a) Forming a laser device to provide an optical resonator cavity, with a semiconductor body disposed within that resonator cavity having a scanning surface disposed transverse to the cavity.

(b) Forming that resonator cavity with mirrors having confronting reflective surfaces, one surface being fully reflective and the other surface being partially relfective to pass the laser beam from the cavity.

(c) Pumping the semiconductor body by means of an electron beam to produce emitted light radiation within that resonator cavity.

(d) Controlling that electron beam to scan the scanning surface of the semiconductor body in a predetermined pattern, thereby producing a laser beam emanating from the resonator cavity which moves relative to that cavity following the pattern of the scanning electron beam.

(e) Modulating the intensity of the moving laser beam.

(f) Focusing the moving laser beam to project an enlarged image at an imaging surface.

(g) Sweeping the electron beam across the scanning surface of the semiconductor body in accordance with a predetermined sweep signal, and modulating the intensity of the laser beam in accordance with a predetermined intensity signal synchronized with the predetermined sweep signal.

(h) Controlling the sweeping of the electron beam by means of the sweep signal portion of a video signal, and controlling the intensity of the moving laser beam by means of the intensity signal portion of the video signal.

What has been described are a novel method and apparatus for producing a television picture image, or other image, utilizing a picture image signal generated from a television camera or otherwise, and projecting that image onto a suitable screen or viewing surface by means of a laser device without the use of a cathode ray tube.

A principal feature and advantage of the invention is that the projected image may be enlarged as desired and projected through significant distance with good horizontal and vertical resolution.

While preferred embodiments of the invention have been illustrated and described, it will be understood by those skilled in the art that changes and modifications may be resorted to without departing from the spirit and scope of the invention.

What is claimed is:

1. A method for producing a laser display of an image generated from an image signal, which includes a sweep signal portion and an intensity signal portion,
    forming a laser device having a resonator cavity, and a semiconductor body within said resonator cavity having a scanning surface disposed transverse thereto;
    pumping said semiconductor body by means of a scanning electron beam, to produce a scanning laser beam emanating from said resonator cavity;
    detecting said image signal;
    controlling said electron beam to scan said scanning surface of said semiconductor body in a predetermined pattern determined by said sweep signal portion of said image signal, thereby producing said scanning laser beam which follows the pattern of said scanning electron beam;
    and modulating the intensity of said scanning laser beam by said intensity signal portion of said image signal.

2. A method as set forth in claim 1 including
    scanning said electron beam across said scanning surface of said semiconductor body in accordance with said sweep signal portion of said image signal;
    and modulating the intensity of said scanning laser beam in accordance with said intensity signal portion synchronized with said sweep signal portion of said image signal.

3. A method as set forth in claim 1 including
    directing said emanating laser beam to project an enlarged image at an imaging surface.

4. A method as set forth in claim 2 including
    controlling the scanning of said electron beam by means of said sweep signal portion of said image signal generated as a television image signal;
    and controlling the intensity of said scanning laser beam by means of said intensity signal portion of said television image signal.

5. A method as set forth in claim 1 including
    focusing and enlarging said emanating laser beam to project an enlarged image at an imaging surface.

6. A method as set forth in claim 1 including
    forming said laser device resonator cavity from confronting fully reflective and partially reflective optical mirrors having their reflective surfaces disposed in parallel planes; and placing said semiconductor body between said confronting reflective faces of said mirrors, whereby said scanning laser beam will emanate from said laser device through said partially reflective mirror.

7. A method as set forth in claim 1 including
    forming said semi-conductor body from a material selected from a group consisting of: ZnO, GaAs, ZnS, CdS, GaSe, $CdS_xSe_{1-x}$, CdSe, CaTe, GaSb, InAs, InSb, Te, PbS, PbTe, PbSe, and CaSe.

8. Apparatus for producing a laser beam projection image comprising
    a laser device including an optical resonator cavity formed between confronting fully reflective and partially reflective surfaces, and including a semiconductor body disposed within said resonator cavity having a scanning surface transverse to the axis of said cavity;
    an electron gun disposed to direct an electron beam toward said scanning surface of said semiconductor body, to pump said body to produce a laser beam in cooperation with said resonator cavity; means for sweeping said electron beam across said scanning surface, to produce said laser beam moving correspondingly relative to said scanning surface;
    light modulating means disposed outside said resonator cavity to modulate said laser beam emanating therefrom;
    and control means responsive to a generated image signal for controlling said electron beam sweeping means and for controlling said modulating means.

9. Apparatus as set forth in claim 8 including
    said sweeping means comprising horizontal and vertical deflection means for effecting the sweeping of said electron beam in response to said control means being synchronized with said control means for said electron beam sweeping means.

10. Apparatus as set forth in claim 8 including
optical focusing means disposed to focus and project said emanating laser beam onto an imaging surface.

11. Apparatus as set forth in claim 8 including
said resonator cavity being defined by two mirror devices having said confronting reflective surfaces disposed in parallel planes; said mirror devices being disposed in the path of said electron beam, with respective reflective surfaces disposed perpendicular to the axis of said electron gun; one of said mirror devices, having said fully reflective surface, being disposed nearer to said electron gun and comprising an electron passive material;
said semiconductor body being disposed between said mirror devices, and having a planar scanning surface confronting the reflective surface of said nearer mirror device.

12. Apparatus as set forth in claim 11 including
said semiconductor body being disposed adjacent to the other of said mirror devices, having said partially reflective surface; means associated with said semiconductor body providing an anode for said electron gun.

13. Apparatus as set forth in claim 8 including
said semiconductor body consisting of a material selected from a group including: ZnO, GaAs, ZnS, CdS, GaSe, $CdS_xSe_{1-x}$, CdSe, CaTe, GaSb, InAs, InSb, Te, PbS, PbTe, PbSe, and CaSe.

14. Apparatus as set forth in claim 8 comprising
first and second mirror devices providing said fully reflective and partially reflective surfaces;
said first mirror device, having said fully reflective surface, being disposed in the path of the electron beam produced by said electron gun, with said fully reflective surface being planar and disposed at an angle relative to the axis of said electron gun;
said semiconductor body being disposed in contiguous relation with said first mirror device;
said second mirror device, having said partially reflective surface, being disposed with said partially reflective surface in parallel spaced relation to said fully reflective surface of said first mirror device, and being positioned out of the path of said electron beam.

* * * * *